US007909426B2

(12) United States Patent
Kim

(10) Patent No.: US 7,909,426 B2
(45) Date of Patent: Mar. 22, 2011

(54) APPARATUS AND METHOD FOR INSPECTING DROPLET DISCHARGE CHARACTERISTICS OF INK-JET PRINTED HEAD

(75) Inventor: Joon-Hyung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 43 days.

(21) Appl. No.: 12/312,458

(22) PCT Filed: Nov. 12, 2007

(86) PCT No.: PCT/KR2007/005666
§ 371 (c)(1),
(2), (4) Date: May 12, 2009

(87) PCT Pub. No.: WO2008/060076
PCT Pub. Date: May 22, 2008

(65) Prior Publication Data

US 2010/0045731 A1 Feb. 25, 2010

(30) Foreign Application Priority Data

Nov. 13, 2006 (KR) ........................ 10-2006-0111756

(51) Int. Cl.
*B41J 29/393* (2006.01)
*G06K 9/00* (2006.01)
*G01B 11/14* (2006.01)

(52) U.S. Cl. ........................... 347/19; 382/107; 356/614

(58) Field of Classification Search ..................... 347/19
See application file for complete search history.

(56) References Cited

U.S. PATENT DOCUMENTS 4,729,109 A * 3/1988 Adrian et al. ................... 356/28
7,307,739 B2 * 12/2007 Kamiya et al. ................ 356/627
7,342,670 B2 * 3/2008 Teichman ....................... 347/19

FOREIGN PATENT DOCUMENTS

JP 11-227172 8/1999
JP 2006-110774 4/2006
JP 2006-110776 4/2006
JP 2006-281714 10/2006

* cited by examiner

*Primary Examiner* — Matthew Luu
*Assistant Examiner* — Shelby Fidler
(74) *Attorney, Agent, or Firm* — McKenna Long & Aldridge LLP

(57) ABSTRACT

An apparatus and method for inspecting droplet discharge characteristics of an ink-jet printer head by photographing an overlapped droplet image for a plurality of ink droplet successively discharged from the ink-jet printer head.

13 Claims, 4 Drawing Sheets

[Fig. 1]
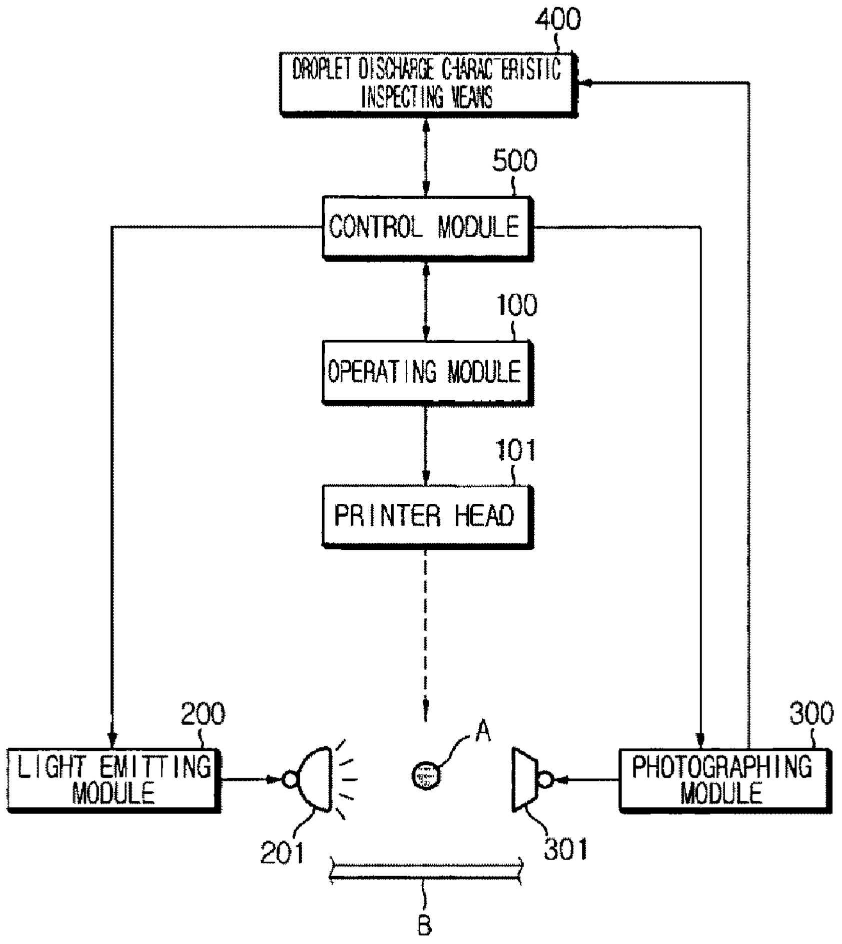
[Fig. 2]
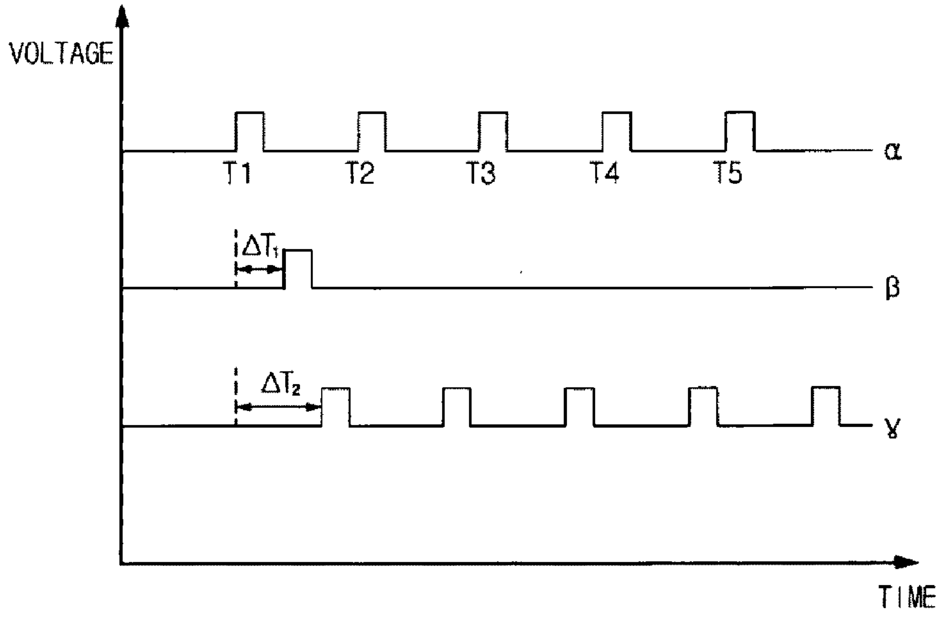

[Fig. 3]
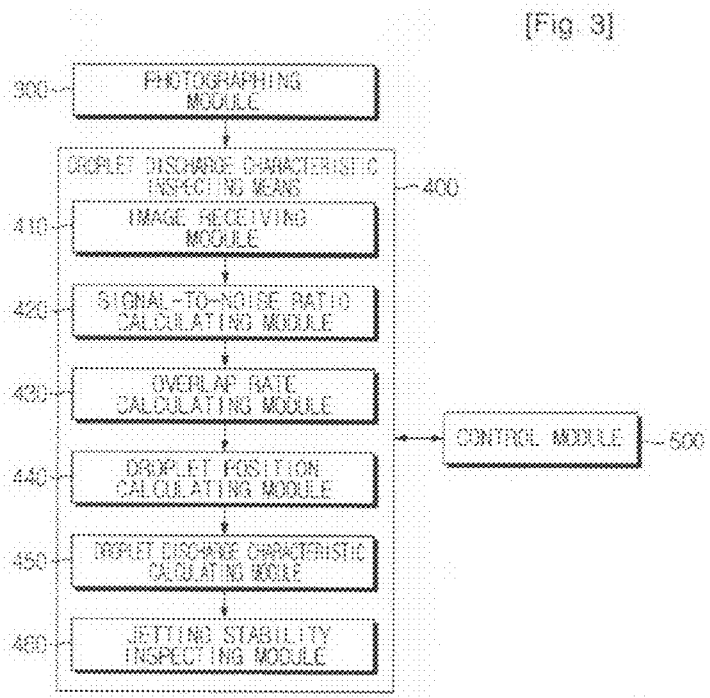
[Fig. 4]
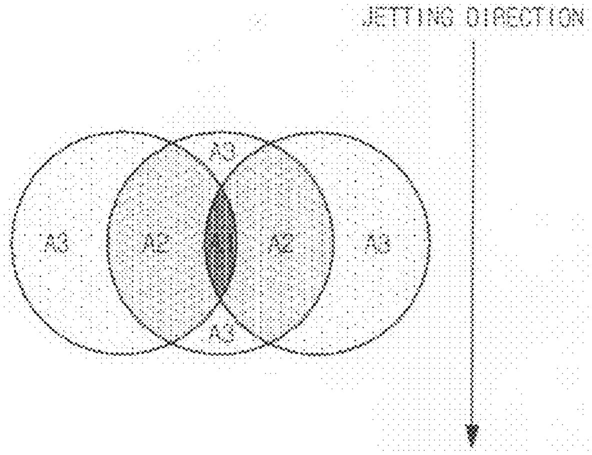
[Fig. 5]
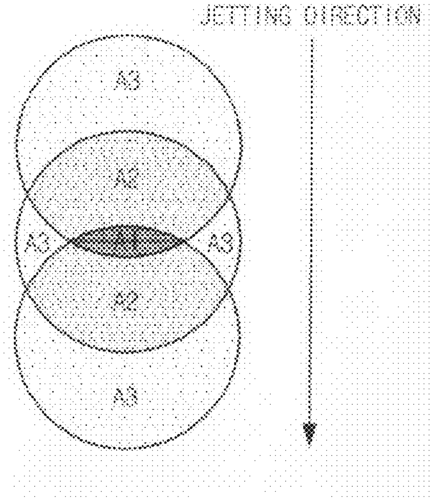

[Fig. 6]
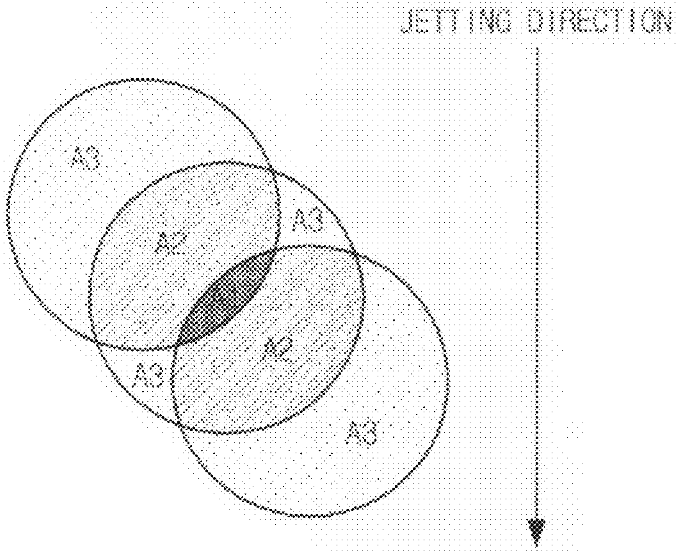
[Fig. 7]
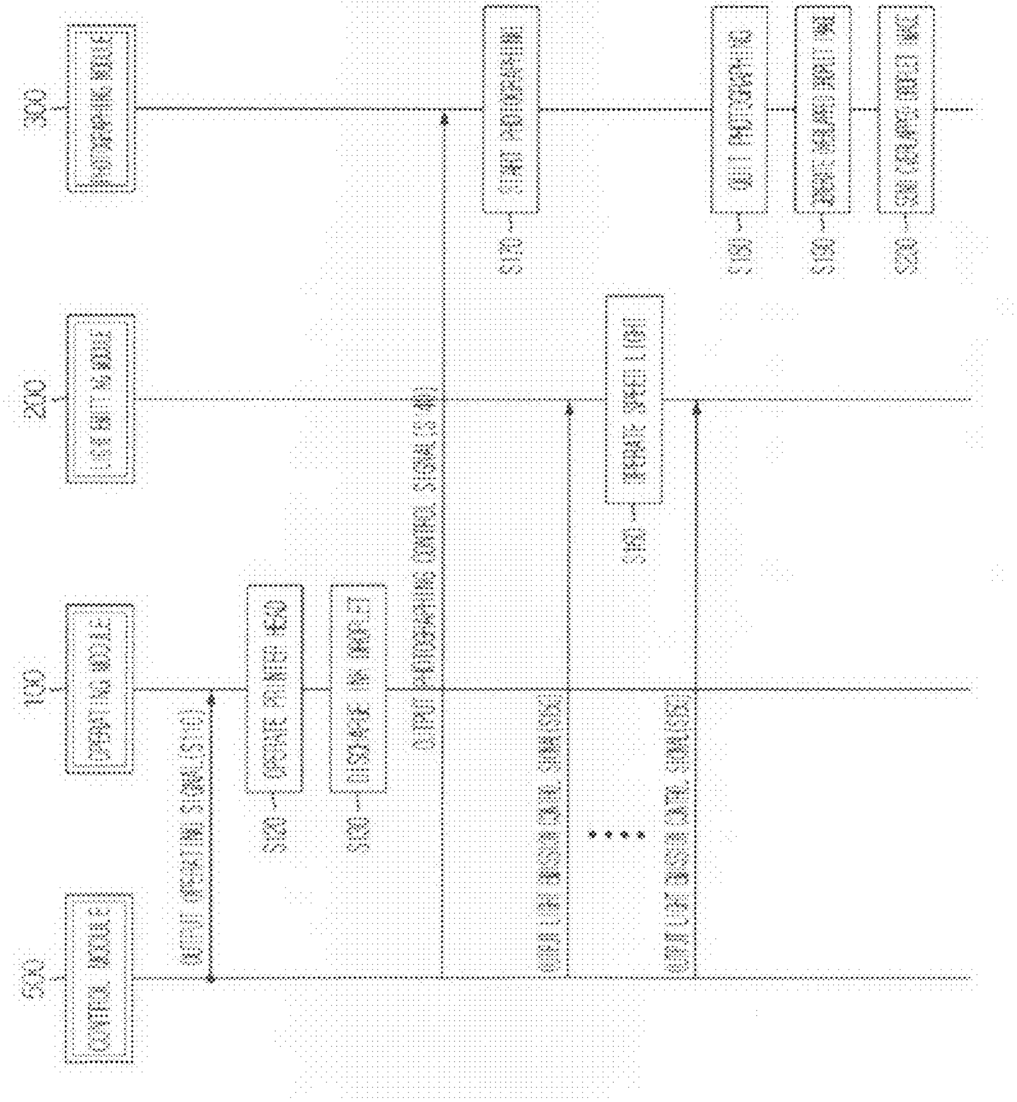

[Fig. 8]
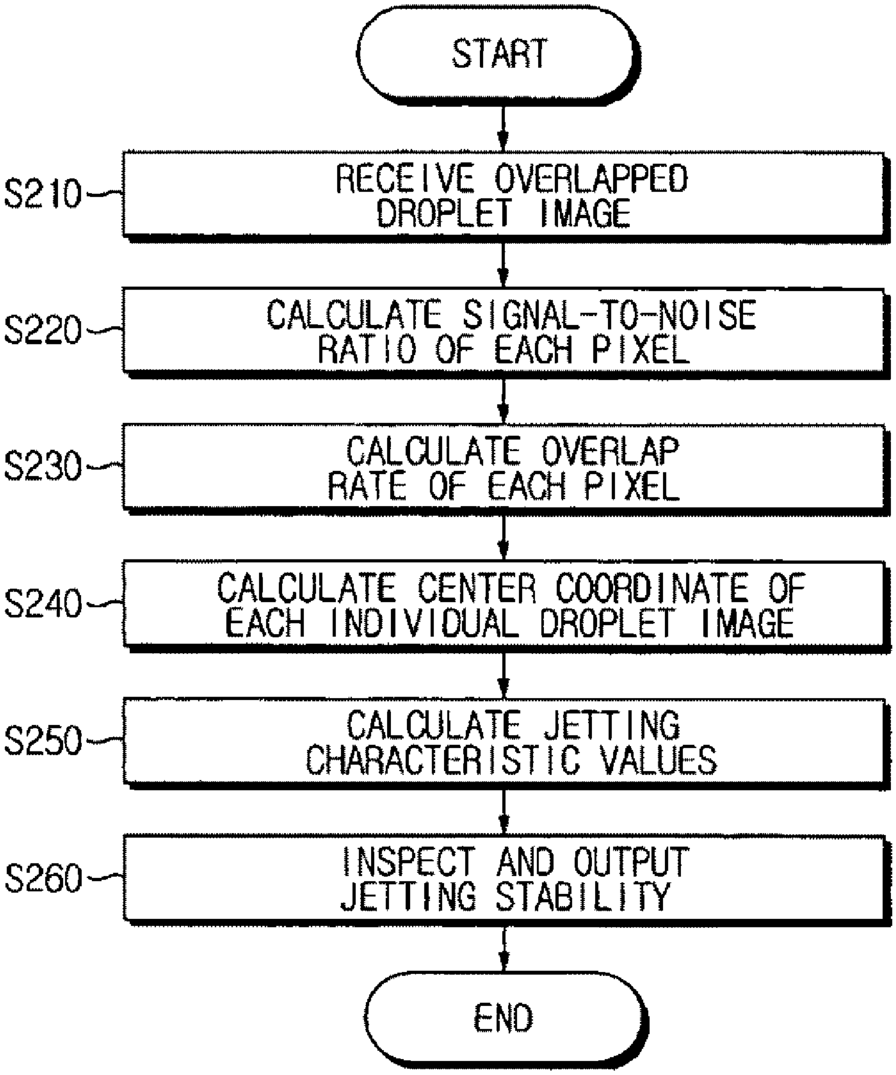

APPARATUS AND METHOD FOR INSPECTING DROPLET DISCHARGE CHARACTERISTICS OF INK-JET PRINTED HEAD

This application is a 35 U.S.C. §371 National Stage entry of International Application No. PCT/KR2007/005666, filed on Nov. 12, 2007, and claims the benefit of Korean Application No. 10-2006-0111756, filed on Nov. 13, 2006 which is hereby incorporated by reference in its entirety.

TECHNICAL FIELD

The present invention relates to apparatus and method for inspecting droplet discharge characteristics of an ink-jet printer head, and more particularly to apparatus and method for inspecting droplet discharge characteristics of an ink-jet printer head by photographing an overlapped droplet image for a plurality of ink droplets successively discharged from the ink-jet printer head.

BACKGROUND ART

Generally, an ink-jet printer may realize various colors with less noise due to the use of a cartridge and also ensures beautiful quality of printed text, differently from a dot printer, so the ink-jet printer is used more and more.

An ink-jet printer head is a means for discharging fine-droplets-of a printing ink to a desired position on a recording paper to print an image with a predetermined color. For this purpose, an ink droplet is discharged from a nozzle installed to the printer head, and the discharged ink droplet is hit to the recording paper. As intervals of hit droplets are closer, a higher quality of image may be output.

The printing quality using discharged ink droplets may be inspected using on characteristic values such as brightness and resolution of image, and these characteristic values depend on discharge of ink droplet of the ink-jet printer head, namely droplet discharge characteristics (or, jetting characteristics).

The droplet discharge characteristics of the ink-jet printer head act as an important factor to verify reliability of an ink-jet printer, and the droplet discharge characteristics of an ink-jet printer head are generally inspected before the printing process.

As a droplet discharge characteristic inspecting method, there was used a method of hitting an ink discharged from an ink-jet printer head to a paper, and then detecting a hit position of the ink printed on the paper.

However, in this method, a maximum number of ink droplets capable of being printed on an A4-sized paper without overlapping is 300,000, and the number of nozzles provided to an ink-jet printer head is about 100. Thus, in case jetting is conducted several thousand times at each nozzle, the number of droplets may exceed a capacity of one paper, so it may be impossible to determine whether jetting is conducted stably for several hours.

In addition, to solve this problem, there is a method of conducting the printing on a paper roll of several meters, instead of a paper sheet. However, this method has. problems of long-time consumption and much usage of paper, though position errors of hit ink droplets may be distinctly observed for each ink droplet.

As another method, there was proposed an ink droplet checking method that analyzes size and interval of sprayed ink droplets while scanning them according to a nozzle heat of a printer head using a digital camera.

This ink droplet checking method may allow to measure an abnormal jetting error caused by clogged nozzle or contamination, but it is not suitable for measuring a precise deviation required for high precision printing, namely quantitative analysis of droplet discharge characteristics according to velocity and orientation of ink droplets.

As another method, Japanese Laid-open Patent Publication No. 1999-227172 discloses a discharge checking device of an ink-jet printer head, including a printer head driving circuit, a camera, a camera control circuit, a stroboscope, a time delay circuit and a measuring circuit, which photographs an ink droplet discharged from a printer head several times with time intervals to measure a velocity of the ink droplet from a time difference of the ink droplet photograph.

This technique allows measuring an error of discharging timing since a velocity of ink droplet is measured. However, by simply measuring deviation of discharging timing, it is impossible to measure an error of discharging orientation, namely to measure a trajectory of ink droplet discharged from the printer head to a hit point, and also it is impossible to check a composite fine deviation error required for high precision printing.

In particular, simple image observation may allow detecting a serious jetting inferiority, but it has a limit in inspecting stability of ink jetting, required for high precision printing of a substrate that needs precision.

DISCLOSURE OF INVENTION

Technical Problem

The present invention is designed to solve the problems of the prior art, and therefore it is an object of the present invention to provide apparatus and method for inspecting droplet discharge characteristics of an ink-jet printer head, which quantitatively analyzes an overlapped droplet image for a plurality of ink droplets,. photographed at the same position, thereby allowing quantitative precise inspection of inferior factors of minute ink-jetting quality.

Technical Solution

In order to accomplish the above object, there is provided an apparatus for inspecting droplet discharge characteristics of an ink-jet printer head that subsequently discharges ink droplets, which includes a photographing means for operating a digital camera to generate an overlapped droplet image for a plurality of ink droplets at a predetermined photographing point before each of the subsequently discharged ink droplets hits a target point; a light emitting means for operating a speed light to give a light to an ink droplet that passes the photographing point after a predetermined delay time from a discharging time point of each ink droplet; and a droplet discharge characteristic inspecting means for calculating a signal-to-noise ratio distribution of each pixel of the overlapped droplet image, calculating an overlap rate of droplet images of each pixel from the calculated signal-to-noise ratio distribution to calculate a center coordinate of a predetermined number of droplet images, and quantitatively calculating and outputting deviation to droplet jetting velocity and direction using the calculated center coordinate of droplet image, a droplet jetting coordinate and the delay time.

Preferably, the droplet discharge characteristic inspecting means includes an image receiving module for receiving the overlapped droplet image from the photographing means; a signal-to-noise ratio calculating module for calculating a signal-to-noise ratio of each pixel of the overlapped droplet image; an overlap rate calculating module for calculating a droplet image overlap rate of each pixel from the signal-to-noise ratio of each pixel; a droplet position calculating module for calculating a center coordinate of a predetermined number of droplet images by statistically analyzing droplet size, position distribution of pixels with the same overlap rate of each pixel, and the number of photographed droplets; and a droplet discharge characteristic value calculating module for quantitatively calculating deviation for droplet jetting velocity and direction from the center coordinate of the droplet image, a droplet jetting coordinate and the delay time.

Preferably, the deviation is a standard deviation of the jetting velocity and direction with respect to a predetermined number of droplets.

The apparatus for inspecting droplet discharge characteristics of an ink-jet printer head according to the present invention may further include a jetting stability inspecting module for determining stability of the droplet discharge characteristics depending on whether the standard deviation exceeds a criterion value, and then outputting the determination result through an external device.

Selectively, the signal-to-noise calculating module may output the signal-to-noise ratio distribution of each pixel of the overlapped droplet image through an external device.

In another aspect of the present invention, there is also provided an apparatus for inspecting droplet discharge characteristics of an ink-jet printer head that subsequently discharges ink droplets, which includes a photographing means for operating a digital camera to generate an overlapped droplet image for a plurality of ink droplets at a predetermined photographing point before each of the subsequently discharged ink droplets hits a target point; a light emitting means for operating a speed light to give a light to an ink droplet that passes the photographing point after a predetermined delay time from a discharging time point of each ink droplet; and a droplet discharge characteristic inspecting means for presuming a center coordinate of a pixel with a predetermined gray level in a long or short axis direction of the overlapped droplet image and a center coordinate of the overlapped droplet image as a center coordinate of a droplet whose discharge characteristics will be inspected, and quantitatively calculating and outputting deviation of droplet jetting velocity and direction using the presumed center coordinate of droplet, a droplet jetting coordinate and the delay time.

Preferably, the droplet discharge characteristic inspecting means calculates a histogram distribution according to the gray level in a long or short axis direction of the overlapped droplet image, and then presuming a coordinate of a pixel corresponding to $k\sigma$ (k is a constant, $\sigma$ is a standard deviation) on the histogram distribution and a center coordinate of the overlapped droplet image as a center coordinate of a droplet whose discharge characteristics will be inspected.

Preferably, the deviation of the droplet jetting velocity and direction is a standard deviation of jetting velocity and direction of the droplet whose center coordinate is presumed.

Selectively, the droplet discharge characteristic inspecting means may determine stability of discharge characteristics depending on whether the standard deviation exceeds a criterion value, and then output the determination result through an external device.

In still another aspect of the present invention, there is also provided a method for inspecting droplet discharge characteristics of an ink-jet printer head, which includes obtaining an overlapped droplet image by photographing a plurality of ink droplets successively discharged from the ink-jet printer head at the same photographing point; calculating a signal-to-noise ratio distribution of each pixel of the overlapped droplet image; calculating a center coordinate of a predetermined number of droplet images by calculating a droplet image overlap rate of each pixel from the calculated signal-to-noise ratio distribution; and quantitatively calculating and outputting deviation of jetting velocity and direction of the droplet by using the calculated center coordinate of droplet, a droplet jetting coordinate, and a delay time between a droplet jetting time point and a light giving time point for photographing the droplet.

In further another aspect of the present invention, there is also provided a method for inspecting droplet discharge characteristics of an ink-jet printer head, which includes obtaining an overlapped droplet image by photographing a plurality of ink droplets successively discharged from the ink-jet printer head at the same photographing point; presuming a center coordinate of a pixel with a predetermined gray level in a long or short axis direction of the overlapped droplet image and a center coordinate of the overlapped droplet image as a center coordinate of a droplet whose discharge characteristics will be inspected; and quantitatively calculating and outputting deviation of droplet jetting velocity and direction using the presumed center coordinate of droplet, a droplet jetting coordinate and a delay time between a droplet jetting time point and a light giving time point for photographing the droplet.

BRIEF DESCRIPTION OF THE DRAWINGS

Other objects and aspects of the present invention will become apparent from the following description of embodiments with reference to the accompanying drawing in which:

FIG. 1 is a block diagram schematically showing an apparatus for inspecting droplet discharge characteristics of an ink-jet printer head according to a preferred embodiment of the present invention;

FIG. 2 is a time chart illustrating applying time points of a driving signal, a photographing control signal and a light emission control signal according to a preferred embodiment of the present invention;

FIG. 3 is a block diagram schematically showing a droplet discharge characteristic inspecting means according to a preferred embodiment of the present invention;

FIGS. 4 to 6 are schematic views showing the phenomenon that a signal-to-noise ratio is increased according to an overlap rate of droplet images in an overlapped droplet image;

FIG. 7 is a flowchart illustrating the process of generating an overlapped droplet image according to a preferred embodiment of the present invention; and FIG. 8 is a flowchart subsequently illustrating the process of inspecting droplet discharge characteristics of an ink-jet printer head according to a preferred embodiment of the present invention.

BEST MODE FOR CARRYING OUT THE INVENTION

Hereinafter, preferred embodiments of the present invention will be described in detailed with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

In the embodiment of the present invention, the term 'jetting stability' of an ink-jet printer head is defined as corresponding to 'hit accuracy' of an ink droplet discharged from a nozzle provided to the ink-jet printer head.

FIG. 1 is a block diagram schematically showing an apparatus for inspecting droplet discharge characteristics of an ink-jet printer head according to a preferred embodiment of the present invention.

Referring to FIG. 1, the apparatus for inspecting droplet discharging characteristics of an ink-jet printer head according to the present invention includes an operating module 100 for controlling operation of an ink-jet printer head 101 from which an ink droplet A is discharged, a light emitting module 200 for controlling light emission of a speed light 201 that irradiates a light toward the discharged ink droplet A, a photographing module 300 for controlling operation of a digital camera 301 that photographs a plurality of ink droplets A passing a predetermined photographing point, a droplet discharge characteristic inspecting means 400 for inspecting droplet discharge characteristics of an ink droplet using an overlapped droplet image of the plurality of ink droplets A, photographed by the digital camera 301.

The operating module 100, the light emitting module 200 and the photographing module 300 are configured as a circuit for transmitting/receiving control signals of a control module 500. As an example, the operating module 100, the light emitting module 200, the photographing module 300 and the control module 500 may be provided as a PCB (Printed Circuit Board), but not limitedly. The control module 500 applies an operating signal to the operating module 100, and also applies a light emission control signal and a photographing control signal, synchronized with the operating signal, to the light emitting module 200 and the photographing module 300, respectively.

Here, an applying time point of the operating signal is substantially identical to the time point that the ink droplet A is discharged from the ink-jet printer head 101. An applying time point of the light emission control signal is a predetermined time later than the applying time point of the operating signal. A time difference between the light emission control signal applying time point and the operating signal applying time point is corresponding to the time consumed during which the ink droplet A passes the droplet photographing point of the digital camera 301 after being discharged from the ink-jet printer head 101. An applying time point of the photographing control signal is synchronized with the applying time point of the operating signal, but it is ahead of the applying time point of the light emission control signal. In addition, an applying period of the photographing control signal is longer than an applying period of the light emission control signal. Thus, while the photographing control signal is applied one time, a plurality of light emission control signals are applied. The operating module 100 operates the ink-jet printer head 101 whenever receiving an operating signal from the control module 500 such that an ink droplet A is discharged from a nozzle (not shown) and then hit to a targeted point of a target B. Here, the target B is preferably a substrate used for making an electronic circuit or a display device, but not limitedly.

The light emitting module 200 operates the speed light 201 whenever receiving a light emission control signal from the control module 500 such that a light for photographing an ink droplet A is provided.

The photographing module 300 operates the digital camera 301 whenever receiving a photographing control signal from the control module 500 such that a plurality of ink droplets A passing a predetermined photographing point is photographed as one frame image. Since a plurality of light emission control signals are applied while one photographing control signal is applied, the digital camera 301 generates an overlapped droplet image for the plurality of ink droplets A passing the photographing point. That is to say, since the digital camera 301 keeps its exposed state while the plurality of ink droplets A are passing, the digital camera 301 photographs images of the ink droplets A as much as the number of light emission control signals applied-while the exposed state is kept, thereby generating an overlapped droplet image. The overlapped droplet image has a pattern that a plurality of droplet images are overlapped. If the overlapped droplet image is generated, the photographing module 300 outputs it to the droplet discharge characteristic inspecting means 400.

Here, the speed light 201 and the digital camera 301 are preferably installed to face each other based on the photographing point. The digital camera 301 is preferably an image sensor camera having CCD or CMOS, and the speed light 201 is preferably a Strobo light that generates a streamer instantly according to the application of a light emission control signal.

The droplet discharge characteristic inspecting means 400 calculates a signal-to-noise ratio distribution of the overlapped droplet image photographed by the digital camera 301 according to the control of the control module 500, calculates a droplet image overlap rate of each pixel from the calculated signal-to-noise ratio distribution, and quantitatively inspects and outputs characteristics of jetting velocity and jetting direction of the ink droplet.

FIG. 2 is a time chart illustrating applying time points of an operating signal, a light emission control signal and a photographing control signal while droplet discharge characteristics of the ink-jet printer head 101 are inspected.

Referring to FIGS. 1 and 2, the control module 500 applies operating signals (a) to the operating module 100 at time points T1, T2, T3, . . . such that ink droplets A are discharged from the ink-jet printer head 101. The control module 500 applies a photographing control signal (β) to the photographing module 300 after a predetermined time ($\Delta t_1$) passes from the time point T1, thereby operating a shutter of the digital camera 301. The digital camera 301 keeps an exposed state for a predetermined time from the time point that the photographing control signal (β) is applied thereto. In this state, the control module 500 applies a light emission control signal (γ) to the light emitting module 200 after a predetermined time ($\Delta t_2$) passes from the time point T1. The light emission control signal (γ) is synchronized with the time point that the ink droplet A passes the photographing point, and it is applied several times while the digital camera 301 keeps its exposed state. Thus, the digital camera 301 photographs an overlapped droplet image for a plurality of ink droplets A by just one exposure.

FIG. 3 is a block diagram schematically showing the droplet discharge characteristic inspecting means 400 according to the present invention.

Referring to FIG. 3, the droplet discharge characteristic inspecting means 400 quantitatively inspects droplet discharge characteristics of the ink-jet printer head 101 according to the control of the control module 500 and then outputs the inspection result.

The droplet discharge characteristic inspecting means 400 includes an image receiving module 410, a signal-to-noise ratio calculating module 420, an overlap rate calculating module 430, a droplet position calculating module 440, a droplet discharge characteristic calculating module 450, and a jetting stability inspecting module 460.

The image receiving module 410 receives an overlapped droplet image from the photographing module 300 and then outputs it to the signal-to-noise ratio calculating module 420.

The signal-to-noise ratio calculating module 420 calculates a signal-to-noise ratio of each pixel of the overlapped droplet image. The signal-to-noise ratio is calculated based on Gray level analysis. However, the present invention is not limited thereto.

The signal-to-noise ratio of each pixel of the overlapped droplet image is increased in proportion to the number of overlapping of the droplet images. It may be explained using the ensemble average theory. That is to say, when n number of droplet images are overlapped, the sum of signals of each pixel included in the overlapped droplet image is n times of the corresponding pixel signal $S_x$ of an individual droplet image, and noise of each pixel is $\sqrt{n}$ time of noise $N_x$ of the corresponding pixel of an individual droplet image due to the random characteristic. Thus, a signal-to-noise ratio of each pixel of the overlapped droplet image is equal to a value obtained by multiplying a square root $\sqrt{n}$ of the overlap number n by the signal-to-noise ratio of the individual droplet image as seen in the following equation 1.

$$\frac{S}{N} = \frac{nS_x}{\sqrt{n}\,N_x} = \sqrt{n}\,\frac{S_x}{N_x} \quad \text{Equation 1}$$

In the equation 1, S/N is a signal-to-noise ratio of each pixel of the overlapped droplet image, and $S_x/N_x$ is a signal-to-noise ratio of each pixel of the individual droplet image.

FIGS. 4 to 6 are schematic views showing the concept that a signal-to-noise ratio is increased according to the number of overlap of an individual droplet image in the overlapped droplet image.

FIG. 4 shows the case that a direction deviation of ink jetting is generated, and thus droplet pass different positions in a horizontal direction when the speed light is operated according to the application of a light emission control signal. If an overlapped droplet image is generated as shown in FIG. 4, three droplet images are overlapped in a pixel corresponding to A1 region, two droplet images are overlapped in a pixel corresponding to A2 region, and no overlap of droplet image occurs in a pixel corresponding to A3 region. Thus, image flowing is decreased and a signal-to-noise ratio is increased from the A3 region to the A1 region.

FIG. 5 shows the case that a velocity deviation of ink jetting is generated, and thus droplets pass different positions in a vertical direction when the speed light is operated according to the application of a light emission control signal. If an overlapped droplet image is generated as shown in FIG. 5, three droplet images are overlapped in a pixel corresponding to A1 region, two droplet images are overlapped in a pixel corresponding to A2 region, and no overlap of droplet image occurs in a pixel corresponding to A3 region. Thus, image flowing is decreased and a signal-to-noise ratio is increased from the A3 region to the A1 region.

FIG. 6 shows the case that a velocity deviation and a direction deviation of ink jetting are generated at the same time, and thus droplets pass different positions in a diagonal direction when the speed light is operated according to the application of a light emission control signal. If an overlapped droplet image is generated as shown in FIG. 6, three droplet images are overlapped in a pixel corresponding to A1 region, two droplet images are overlapped in a pixel corresponding to A2 region, and no overlap of droplet image occurs in a pixel corresponding to A3 region. Thus, image flowing is decreased and a signal-to-noise ratio is increased from the A3 region to the A1 region.

The signal-to-noise ratio calculating module 420 may generate a signal-to-noise ratio distribution by giving the same color to pixels with the same signal-to-noise ratio in the overlapped droplet image and giving more shading as the signal-to-noise ratio is greater, and then output the signal-to-noise ratio distribution to an external device. Here, the external device may be a printing deice or a display device, well known in the art.

As shown in FIGS. 4 to 6, the signal-to-noise ratio distribution of the overlapped droplet image has an inherent pattern as deviation is generated in jetting velocity and/or direction. If deviation of jetting velocity or direction is not generated, all droplet images are photographed at the same position, so there would be no orientation in droplet image arrangement. Thus, by analyzing the pattern of the signal-to-noise ratio distribution, it is possible to easily check whether a cause of inferiority is in velocity deviation of ink jetting, direction deviation of ink jetting, or both of them.

The overlap rate calculating module 430 calculates a droplet image overlap rate of each pixel from the signal-to-noise ratio of each pixel. Here, the droplet image overlap rate is a quantitative factor indicating how much droplet images are overlapped in the corresponding pixel. If the droplet image overlap rate is great, it means a lot of droplet images are overlapped as much. The droplet image overlap rate of each pixel may be calculated using the following equation 2, but not limitedly.

$$\frac{\text{Number of Overlapped Droplet Images}}{\text{Number of Total Droplet Images}} = \frac{\frac{S_{n-i}}{N_n}}{\frac{S_n}{N_n}} = \frac{\frac{(n-i)S_n}{\sqrt{n}\,N_n}}{\frac{nS_n}{\sqrt{n}\,N_n}} = \frac{n-i}{n} \quad \text{Equation 2}$$

In the equation 2, $S_{n-i}/N_n$ is a signal-to-noise ratio of each pixel of the overlapped droplet image photographed according to the present invention, $S_n/N_n$ is a signal -to-noise ratio of each pixel under assumption that all droplet images are completely overlapped, and n and i are a total number of droplet images and a number of non-overlapped droplet images, respectively. A droplet image overlap rate of each pixel is calculated as ratios of $S_{n-i}/N_n$ and $S_n/N_n$.

Meanwhile, the overlap rate calculating module 430 may obtain a signal-to-noise ratio according to an overlap number of droplet images, then configure the overlap number of droplet images and the signal-to-noise ratio into a lookup table format, and then calculate an overlap rate of each pixel of the overlapped droplet image with reference to the lookup table.

The overlap rate calculating module 430 calculates an overlap rate of each pixel and then outputs it to the droplet position calculating module 440. Then, the droplet position calculating module 440 statistically analyzes droplet size, distribution of pixels with the same overlap rate as each pixel of the overlapped droplet image, and the number of photographed droplets, and then calculates a center coordinate of each droplet image of the overlapped droplet image. That is to say, a center coordinate of each droplet image of the overlapped droplet image shown in FIGS. 4 to 6 as examples is calculated.

As an alternative, the droplet position calculating module 440 may presume a coordinate of a pixel with a predetermined gray level in a long or short axis direction of the overlapped droplet image and a center coordinate of the overlapped droplet image as a center coordinate of a droplet image whose droplet discharge characteristics will be analyzed. In this case, the droplet position calculating module 440 is operated as follows. For reference, it is presumed that the number of droplets whose center coordinates will be estimated is presumed as three. However, the present invention is not limited thereto. First, circularity of a droplet image and length and direction of longest axis and width (or, a maximum width measured in a direction perpendicular to the longest axis) are checked. After that, a gray level data of each pixel is extracted along a long or short axis. Subsequently, a histogram of gray level according to position of each pixel, which configures the long or short axis, is obtained. The obtained histogram has normal distribution, so an average value and a standard deviation are obtained in a statistical method from the distribution. After that, coordinates of two pixels corresponding to the standard deviations 1σ and 2σ and a coordinate of a center pixel of the overlapped droplet image are obtained. The obtained three coordinates will be center coordinates of droplets to be presumed. If the number of standard deviations is increased, the number of ink droplets whose center coordinates will be presumed is also increased, as apparent to those having ordinary skill in the art.

The droplet position calculating module 440 receives the center coordinate of individual droplet image, and then outputs it to the droplet discharge characteristic calculating module 450. The droplet discharge characteristic calculating module 450 calculates droplet discharge characteristics of droplets whose center coordinates are already obtained. The droplet discharge characteristics include jetting velocity and direction of each droplet whose center coordinate is obtained, and their average value a standard deviation. The jetting velocity of a droplet is calculated using a distance between the center coordinate of the droplet image and a coordinate assigned to an end of the ink jetting nozzle and a delay time between the operating signal for ink droplet jetting and the photographing control signal. The jetting direction of a droplet is calculated using a vector between the center coordinate of the droplet image and the coordinate assigned to the end of the ink jetting nozzle. After calculating the jetting velocity and direction of each droplet, the droplet discharge characteristic calculating module 450 calculates average value and standard deviation for the jetting velocity and direction. The droplet discharge characteristic calculating module 450 may receive presumed center coordinates of a predetermined number of droplets from the droplet position calculating module 440. In this case, jetting velocity and direction of droplet and their average value and standard deviation are calculated using the presumed center coordinates.

The droplet discharge characteristic calculating module 450 may output the calculated droplet discharge characteristics through an external device. Here, the external device may be a printing device or a display device, well known in the art. The information output as mentioned above may be utilized to correct droplet discharge characteristics of the ink-jet printer head. The droplet discharge characteristic calculating module 450 may output the calculated droplet discharge characteristics to the jetting stability inspecting module 460.

The jetting stability inspecting module 460 compares the magnitude of standard deviation for the jetting velocity and direction with a predetermined criterion, and then determines jetting stability based on whether they exceed the criterion value. That is to say, if the standard deviation of jetting velocity and direction does not exceed the criterion, the jetting stability inspecting module 460 may determined that there is no problem in jetting stability, and then output the determination result through an external device. Meanwhile, if the standard deviation of jetting velocity and direction exceeds the criterion, the jetting stability inspecting module 460 may determine that there is a problem in jetting stability, and then output the determination result through an external device. At this time, the output information preferably includes the kind of droplet discharge characteristic (velocity and/or direction) having a problem in stability, and an exceeding rate beyond the criterion.

Now, operations of the droplet discharge characteristic inspecting apparatus of an ink-jet printer head according to the present invention will be explained in detail with reference to 7 and 8.

First, a process of generating an overlapped droplet image is explained with reference to FIGS. 1 and 7. If the control module 500 outputs an operating signal to the operating module 100, the operating module 100 operates the ink-jet printer head 101 according to the operating signal such that an ink droplet is discharged from the nozzle of the ink-jet printer head 101 (S110 to S130).

Subsequently, the control module 500 applies a photographing control signal and a light emission control signal to the photographing module 300 and the light emitting module 200, respectively (S140, S150). Here, applying time point and period of the photographing control signal and the light emission control signal are already explained in detail above with reference to FIG. 2. Then, the light emitting module 200 operates the speed light 201 to give a light whenever an ink droplet A passes a photographing point (S160), and the photographing module 300 keeps an exposed state of the digital camera 301 for a predetermined time, thereby photographing a plurality of ink droplets A passing the photographing point to generate an overlapped droplet image (S170, S180, S190). After that, the photographing module 300 sends the generated overlapped droplet image to the droplet discharge characteristic inspecting means 400 (S200).

Now, a process of quantitatively inspecting droplet discharge characteristics of the ink-jet printer head 101 will be explained with reference to FIGS. 1 and 8. The droplet discharge characteristic inspecting means 400 receives the overlapped droplet image from the photographing module 300 under the control of the control module 500 (S210).

Subsequently, the droplet discharge characteristic inspecting means 400 calculates a signal-to-noise ratio of each pixel of the overlapped droplet image (S220).

And then, the droplet discharge characteristic inspecting means 400 calculates an overlap rate of each pixel from the signal-to-noise ratio of the overlapped droplet image (S230).

After that, the droplet discharge characteristic inspecting means 400 statistically analyzes droplet size, distribution of pixels with the same overlap rate as each pixel of the overlapped droplet image, and the number of photographed droplets to calculate a center coordinate of each individual droplet image of the overlapped droplet image (S240). As an alternative, the droplet discharge characteristic inspecting means 400 may presume center coordinates of a limited number of droplet images by means of statistical analysis. Thos presumption method of center coordinate is already explained above.

Then, the droplet discharge characteristic inspecting means 400 calculates droplet discharge characteristics (S250). Here, the droplet discharge characteristics include velocity and direction of droplets whose center coordinates are obtained, and their average value and standard deviation. A calculation method of each droplet discharge characteristic is already explained above.

Finally, the droplet discharge characteristic inspecting means 400 compares standard deviation for the jetting velocity and direction among the droplet discharge characteristics calculated in the step S250 with a predetermined criterion, and then determines jetting stability based on whether they exceed the criterion value and outputs the determination result to an external device (S260).

Meanwhile, the droplet discharge characteristic inspecting means 400 may output the signal-to-noise ratio distribution of each pixel of the overlapped droplet image, calculated in the step S220, and the droplet discharge characteristic values calculated in the step S250 through an external device. Then, the droplet discharge characteristics may be qualitatively analyzed using the pattern of signal-to-noise ratio distribution, and the droplet discharge characteristics of the ink-jet printer head may be quantitatively analyzed using the droplet discharge characteristic values.

Operations of the above droplet discharge characteristic inspecting means 400 may be coded as a program algorithm executable by a computer and then loaded to a general computer. In this case, it is apparent that unit modules of the droplet discharge characteristic inspecting means 400 may be understood as functional logic blocks of a program. In addition, the overlapped droplet image may be transmitted to the droplet discharge characteristic inspecting means 400 through an I/O interface of a general computer. In case the droplet discharge characteristic inspecting means 400 is implemented as a program, the program may be recorded in a medium readable by a computer. The computer-readable medium may include program instructions, data files and data structures in single or in combination. The program instructions recorded in the medium may be specially designed or configured for the present invention or already well known to the persons having ordinary skill in the computer program fields. The computer-readable medium includes magnetic media such as hard disk, floppy disk and magnetic tape; magneto-optical media such as floptical disk; and hardware devices specially configured to store and execute program instructions such as ROM, RAM and flash memory. The medium may be a transmission medium such as optical or metallic wire and waveguide, including a carrier wave, which sends a signal designating program instructions and data structure. The program instruction may be machine codes made by a compiler or the like, or high-level language codes executed by a computer using an interpreter or the like. The hardware device may be configured as at least one software module to execute the operations of the present invention, or vice versa.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

According to the present invention, droplet discharge characteristics are quantitatively inspected using an overlapped droplet image, so a complex fine deviation error, required in high precision printing, may be easily inspected.

In addition, velocity and direction of an ink droplet discharged from an ink-jet printer head to a hitting point may be quantitatively analyzed.

Moreover, jetting stability of the ink-jet printer head may be precisely inspected, thereby improving stability and efficiency of the ink-jet process used for making an electronic circuit or a display device.

The invention claimed is:

1. An apparatus for inspecting droplet discharge characteristics of an ink-jet printer head that subsequently discharges ink droplets, the apparatus comprising:
- a photographing means for operating a digital camera to generate an overlapped droplet image for a plurality of ink droplets at a predetermined photographing point before each of the subsequently discharged ink droplets hits a target point;
- a light emitting means for operating a speed light to give a light to an ink droplet that passes the photographing point after a predetermined delay time from a discharging time point of each ink droplet; and
- a droplet discharge characteristic inspecting means for calculating a signal-to-noise ratio distribution of each pixel of the overlapped droplet image, calculating an overlap rate of droplet images of each pixel from the calculated signal-to-noise ratio distribution to calculate a center coordinate of a predetermined number of droplet images, and quantitatively calculating and outputting deviation to droplet jetting velocity and direction using the calculated center coordinate of droplet image, a droplet jetting coordinate and the delay time.

2. The apparatus for inspecting droplet discharge characteristics of an ink-jet printer head according to claim 1, wherein the droplet discharge characteristic inspecting means includes:
- an image receiving module for receiving the overlapped droplet image from the photographing means;
- a signal-to-noise ratio calculating module for calculating a signal-to-noise ratio of each pixel of the overlapped droplet image;
- an overlap rate calculating module for calculating a droplet image overlap rate of each pixel from the signal-to-noise ratio of each pixel;
- a droplet position calculating module for calculating a center coordinate of a predetermined number of droplet images by statistically analyzing droplet size, position distribution of pixels with the same overlap rate of each pixel, and the number of photographed droplets; and
- a droplet discharge characteristic value calculating module for quantitatively calculating deviation for droplet jetting velocity and direction from the center coordinate of the droplet image, a droplet jetting coordinate and the delay time.

3. The apparatus for inspecting droplet discharge characteristics of an ink-jet printer head according to claim 2,
- wherein the deviation is a standard deviation of the jetting velocity and direction with respect to a predetermined number of droplets, and
- wherein the apparatus further comprises a jetting stability inspecting module for determining stability of the droplet discharge characteristics depending on whether the standard deviation exceeds a criterion value, and then outputting the determination result through an external device.

4. The apparatus for inspecting droplet discharge characteristics of an ink-jet printer head according to claim 2, wherein the signal-to-noise calculating module outputs the signal-to-noise ratio distribution of each pixel of the overlapped droplet image through an external device.

5. The apparatus for inspecting droplet discharge characteristics of an ink-jet printer head according to claim 1, further comprising a control means for applying a light emission control signal to the light emitting means after a first delay time from a discharging time point of each ink droplet, and applying a photographing control signal to the photographing means after a second delay time from an initial ink droplet discharging time point such that a plurality of ink droplets to be photographed keep an exposed state while passing a photographing point, wherein the second delay time is longer than the first delay time.

6. The apparatus for inspecting droplet discharge characteristics of an ink-jet printer head according to claim 1, wherein the signal-to-noise ratio of each pixel is increased in proportion to the overlap rate of the droplet image.

7. A method for inspecting droplet discharge characteristics of an ink-jet printer head, comprising:

(a) obtaining an overlapped droplet image by photographing a plurality of ink droplets successively discharged from the ink-jet printer head at the same photographing point;

(b) calculating a signal-to-noise ratio distribution of each pixel of the overlapped droplet image;

(c) calculating a center coordinate of a predetermined number of droplet images by calculating a droplet image overlap rate of each pixel from the calculated signal-to-noise ratio distribution; and (d) quantitatively calculating and outputting deviation of jetting velocity and direction of the droplet by using the calculated center coordinate of droplet, a droplet jetting coordinate, and a delay time between a droplet jetting time point and a light giving time point for photographing the droplet.

8. The method for inspecting droplet discharge characteristics of an ink-jet printer head according to claim 7, wherein the step (a) includes:

operating a speed light to give a light to an ink droplet passing the photographing point after a predetermined delay time from a discharging time point of each ink droplet;

exposing a digital camera installed to the photographing point when a plurality of ink droplets to be photographed pass the photographing point such that an overlapped droplet image for the plurality of ink droplets is generated; and receiving the generated overlapped droplet image.

9. The method for inspecting droplet discharge characteristics of an ink-jet printer head according to claim 7, further comprising:

outputting the signal-to-noise distribution through an external device.

10. The method for inspecting droplet discharge characteristics of an ink-jet printer head according to claim 7, wherein the deviation of jetting velocity and direction is a standard deviation of jetting velocity and direction of the droplet whose center coordinate is calculated.

11. The method for inspecting droplet discharge characteristics of an ink-jet printer head according to claim 10, further comprising:

determining stability of droplet discharge characteristics depending on whether the standard deviation exceeds a criterion value, and then outputting the determination result.

12. The method for inspecting droplet discharge characteristics of an ink-jet printer head according to claim 7, wherein, in the step (c), the droplet image overlap rate of each pixel is in proportion to a signal-to-noise ratio of the corresponding pixel.

13. The method for inspecting droplet discharge characteristics of an ink-jet printer head according to claim 7, wherein, in the step (c), droplet size, position distribution of pixels with the same overlap rate of each pixel, and the number of photographed droplets are quantitatively analyzed to calculate a position of individual droplet image.

* * * * *